United States Patent
Harper et al.

(10) Patent No.: US 8,378,888 B2
(45) Date of Patent: Feb. 19, 2013

(54) SYSTEM AND METHOD FOR DETERMINING THE LOCATION OF A MOBILE DEVICE

(75) Inventors: Neil Harper, Mangerton (AU); Martin Dawson, Wollongong (AU)

(73) Assignee: Andrew LLC, Hickory, NC (US)

( * ) Notice: Subject to any disclaimer, the term of this patent is extended or adjusted under 35 U.S.C. 154(b) by 0 days.

(21) Appl. No.: 13/406,661

(22) Filed: Feb. 28, 2012

(65) Prior Publication Data

US 2012/0154220 A1    Jun. 21, 2012

Related U.S. Application Data

(63) Continuation of application No. 12/272,046, filed on Nov. 17, 2008, now Pat. No. 8,125,377.

(51) Int. Cl.
*G01S 3/02* (2006.01)

(52) U.S. Cl. .................................. 342/357.46; 342/464

(58) Field of Classification Search ............. 342/357.46, 342/386, 463–464
See application file for complete search history.

(56) References Cited

U.S. PATENT DOCUMENTS

| | | | |
|---|---|---|---|
| 4,688,210 A * | 8/1987 | Eizenhofer et al. ............ 370/335 |
| 6,021,330 A * | 2/2000 | Vannucci .................... 455/456.2 |
| 6,097,709 A | 8/2000 | Kuwabara |
| 6,108,558 A | 8/2000 | Vanderspool, II |
| 6,115,605 A | 9/2000 | Siccardo et al. |
| 6,269,246 B1 | 7/2001 | Rao et al. |
| 6,281,834 B1 | 8/2001 | Stilp |
| 6,292,665 B1 * | 9/2001 | Hildebrand et al. ........ 455/456.4 |
| 6,347,228 B1 * | 2/2002 | Ludden et al. .............. 455/456.5 |
| 6,393,294 B1 | 5/2002 | Perez-Breva et al. |
| 6,449,486 B1 | 9/2002 | Rao |
| 6,493,380 B1 * | 12/2002 | Wu et al. ........................ 342/417 |
| 6,510,186 B1 * | 1/2003 | Chen et al. .................. 455/67.16 |
| 6,591,112 B1 | 7/2003 | Siccardo et al. |
| 6,782,265 B2 | 8/2004 | Perez-Breva et al. |
| 6,944,465 B2 | 9/2005 | Spain et al. |
| 7,110,774 B1 * | 9/2006 | Davis et al. ................. 455/456.1 |
| 7,116,987 B2 | 10/2006 | Spain, Jr. et al. |
| 7,167,714 B2 | 1/2007 | Dressler et al. |
| 7,233,799 B2 | 6/2007 | Spain, Jr. |
| 7,250,907 B2 | 7/2007 | Krumm et al. |
| 7,257,414 B2 | 8/2007 | Spain, Jr. et al. |
| 7,383,051 B2 | 6/2008 | Spain, Jr. et al. |
| 7,433,652 B2 | 10/2008 | Durgin |
| 7,433,695 B2 | 10/2008 | Gordon et al. |
| 7,460,505 B2 | 12/2008 | Spain |
| 7,725,111 B2 | 5/2010 | Dressler et al. |
| 7,734,298 B2 | 6/2010 | Bhattacharya et al. |
| 7,753,278 B2 | 7/2010 | Spain, Jr. et al. |

(Continued)

OTHER PUBLICATIONS

Navstar GPS Space Segment/Navigation User Interfaces. Navstar Global Positioning System, Interface Specification, IS-GPS-200, Revision D. ARINC Engineering Services, LLC, p. 40, Dec. 2004.*

(Continued)

*Primary Examiner* — Jack W Keith
*Assistant Examiner* — Fred H Mull
(74) *Attorney, Agent, or Firm* — Duane Morris LLP

(57) ABSTRACT

A system and method for determining the location of a mobile device. A first set of signals from a plurality of radio frequency ("RF") sources may be received at a mobile device and then downconverted into a second set of signals. The mobile device may then time stamp the second set of signals and transmit the time stamped signals to a location determining system. The location of the mobile device may be determined at the location determining system as a function of the time stamped signals.

16 Claims, 9 Drawing Sheets

U.S. PATENT DOCUMENTS

| | | | |
|---|---|---|---|
| 7,796,966 | B2 | 9/2010 | Bhattacharya et al. |
| 7,848,762 | B2 | 12/2010 | Gordon et al. |
| 7,899,467 | B2 | 3/2011 | Feuerstein et al. |
| 8,013,785 | B2 | 9/2011 | Bhattacharya et al. |
| 8,068,802 | B2 | 11/2011 | Bhattacharya et al. |
| 8,068,855 | B2 | 11/2011 | Dressler et al. |
| 8,106,817 | B2 | 1/2012 | Bhattacharya et al. |
| 8,106,818 | B2 | 1/2012 | Bhattacharya et al. |
| 8,125,377 | B2 * | 2/2012 | Harper et al. ............ 342/357.46 |
| 8,155,394 | B2 | 4/2012 | Allegra et al. |
| 2004/0203539 | A1 | 10/2004 | Benes et al. |
| 2005/0227706 | A1 * | 10/2005 | Syrjarinne ................. 455/456.1 |
| 2005/0280569 | A1 * | 12/2005 | Park .............................. 341/155 |
| 2006/0245479 | A1 * | 11/2006 | Raman et al. ................. 375/150 |
| 2007/0001903 | A1 * | 1/2007 | Smith et al. ................... 342/387 |
| 2007/0279280 | A1 * | 12/2007 | Valio et al. ............... 342/357.03 |

OTHER PUBLICATIONS

Center. (2007). In the American Heritage® Dictionary of the English Language. Retrieved from http://www.credoreference.com/entry/hmdictenglang/center.*

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

SYSTEM AND METHOD FOR DETERMINING THE LOCATION OF A MOBILE DEVICE

RELATED APPLICATIONS

The present application is a continuation application and claims the priority benefit of U.S. application Ser. No. 12/272, 046 filed Nov. 17, 2008 entitled "System and Method for Determining the Location of a Mobile Device," now U.S. Pat. No. 8,125,377, the entirety of which is hereby incorporated herein by reference.

BACKGROUND

Radio communication systems generally provide two-way voice and data communication between remote locations. Examples of such systems are cellular and personal communication system ("PCS") radio systems, trunked radio systems, dispatch radio networks, and global mobile personal communication systems ("GMPCS") such as satellite-based systems. Communication in these systems is conducted according to a pre-defined standard. Mobile devices or stations, also known as handsets, portables or radiotelephones, conform to the system standard to communicate with one or more fixed base stations. It is important to determine the location of such a device capable of radio communication especially in an emergency situation. In addition, in 2001 the United States Federal Communications Commission ("FCC") required that cellular handsets must be geographically locatable. This capability is desirable for emergency systems such as Enhanced 911 ("E-911"). The FCC requires stringent accuracy and availability performance objectives and demands that cellular handsets be locatable within 100 meters 67% of the time for network based solutions and within 50 meters 67% of the time for handset based solutions.

Current generations of radio communication generally possess limited mobile device location determination capability. In one technique, the position of the mobile device is determined by monitoring mobile device transmissions at several base stations. From time of arrival or comparable measurements, the mobile device's position may be calculated. However, the precision of this technique may be limited and, at times, may be insufficient to meet FCC requirements. In another technique, a mobile device may be equipped with a receiver suitable for use with a Global Navigation Satellite System ("GNSS") such as the Global Positioning System ("GPS"). GPS is a radio positioning system providing subscribers with highly accurate position, velocity, and time ("PVT") information.

FIG. 1 is a schematic representation of a constellation 100 of GPS satellites 101. With reference to FIG. 1, GPS may include a constellation of GPS satellites 101 in non-geosynchronous orbits around the earth. The GPS satellites 101 travel in six orbital planes 102 with four of the GPS satellites 101 in each plane. Of course, a multitude of on-orbit spare satellites may also exist. Each orbital plane has an inclination of 55 degrees relative to the equator. In addition, each orbital plane has an altitude of approximately 20,200 km (10,900 miles). The time required to travel the entire orbit is just under 12 hours. Thus, at any given location on the surface of the earth with clear view of the sky, at least five GPS satellites are generally visible at any given time.

With GPS, signals from the satellites arrive at a GPS receiver and are conventionally utilized to determine the position of the receiver. GPS position determination is made based on the time of arrival ("TOA") of various satellite signals. Each of the orbiting GPS satellites 101 broadcasts spread spectrum microwave signals encoded with satellite ephemeris information and other information that allows a position to be calculated by the receiver. Presently, two types of GPS measurements corresponding to each correlator channel with a locked GPS satellite signal are available for GPS receivers. The two carrier signals, L1 and L2, possess frequencies of 1.5754 GHz and 1.2276 GHz, or wavelengths of 0.1903 m and 0.2442 m, respectively. The L1 frequency carries the navigation data as well as the standard positioning code, while the L2 frequency carries the P code and is used for precision positioning code for military applications. The signals are modulated using bi-phase shift keying techniques. The signals are broadcast at precisely known times and at precisely known intervals and each signal is encoded with its precise transmission time. There is also an L2C signal being transmitted by several satellites. The L2C signal is a second civilian frequency transmitted by GPS satellites. L1 transmits the Coarse Acquisition ("C/A") code. L2C transmits L2CM (civil-moderate) and L2CL (civil long) codes. These codes allow a device to differentiate between satellites that are all transmitting on the same frequency. The C/A code is 1 milliseconds long, the L2CM is 20 milliseconds long and the L2CL is 1.5 seconds long. The L2C codes provide a more robust cross-correlation performance so that reception of weak GPS signals is less affected by simultaneously received strong GPS signals. The civil navigation message ("CNAV") is the broadcast model that can be transmitted on the L2C and provides a more accurate and frequent message than the legacy navigation message.

Conventional GPS receivers measure and analyze signals from the satellites, and estimate the corresponding coordinates of the receiver position, as well as the instantaneous receiver clock bias. Conventional GPS receivers may also measure the velocity of the receiver. The quality of these estimates depends upon the number and the geometry of satellites in view, measurement error and residual biases. Residual biases generally include satellite ephemeris bias, satellite and receiver clock errors, and ionospheric and tropospheric delays. If receiver clocks were perfectly synchronized with the satellite clocks, only three range measurements would be needed to allow a user to compute a three-dimensional position. This process is known as multilateration. However, given the engineering difficulties and the expense of providing a receiver clock whose time is exactly synchronized, conventional systems generally account for the amount by which the receiver clock time differs from the satellite clock time when computing a receiver's position. This clock bias is determined by computing a measurement from a fourth satellite using a processor in the receiver that correlates the ranges measured from each satellite. This process requires four or more satellites from which four or more measurements can be obtained to estimate four unknowns x, y, z, b. The unknowns are latitude, longitude, altitude and receiver clock offset. The amount b, by which the processor has added or subtracted time, is the instantaneous bias between the receiver clock and the satellite clock. It is possible to calculate a location with only three satellites when additional information is available. For example, if the altitude of the handset or mobile device is well known, then an arbitrary satellite measurement may be included that is centered at the center of the earth and possesses a range defined as the distance from the center of the earth to the known altitude of the handset or mobile device. The altitude of the handset may be known from another sensor or from information from the cell location in the case where the handset is in a cellular network.

Satellite coordinates and velocities have been conventionally computed inside the GPS receiver, and the GPS receiver obtains satellite ephemeris and clock correction data by demodulating the satellite broadcast message stream. The satellite transmission contains more than 400 bits of data transmitted at 50 bits per second. The constants contained in the ephemeris data coincide with Kepler orbit constants requiring many mathematical operations to turn the data into position and velocity data for each satellite. In one implementation, this conversion requires 90 multiplies, 58 adds and 21 transcendental function cells (sin, cos, tan) to translate the ephemeris into a satellite position and velocity vector at a single point, for one satellite. Most of the computations also require double precision, floating point processing.

Thus, the computational load for performing the position calculation is significant. Conventional mobile devices generally must therefore include a high-level processor capable of the necessary calculations, and such processors are relatively expensive and consume large amounts of power. Portable devices for consumer use, e.g., a cellular phone or other comparable device, are preferably inexpensive and operate at very low power. These design goals are inconsistent with the high computational load required for GPS processing.

Further, the slow data rate from the GPS satellites is a limitation. GPS acquisition at a GPS receiver may take many seconds or several minutes, during which time the receiver circuit and processor of the mobile device must be continuously energized. Preferably, to maintain battery life in portable receivers and transceivers such as mobile cellular handsets, circuits are de-energized as much as possible. The long GPS acquisition time can rapidly deplete the battery of a mobile device. In any situation and particularly in emergency situations, the long GPS acquisition time is inconvenient.

Assisted-GPS ("A-GPS") has gained significant popularity recently in light of stringent time to first fix ("TTFF"), i.e., first position determination and sensitivity, requirements of the FCC E-911 regulations. In A-GPS, a communications network and associated infrastructure may be utilized to assist the mobile GPS receiver, either as a standalone device or integrated with a mobile station or device. The general concept of A-GPS is to establish a GPS reference network (and/or a wide-area D-GPS network or a wide area reference network ("WARN")) including receivers with clear views of the sky that may operate continuously. This reference network may also be connected with the cellular infrastructure, may continuously monitor the real-time constellation status, and may provide data for each satellite at a particular epoch time. For example, the reference network may provide ephemeris information, UTC model information, ionosphere model information, and other broadcast information to the cellular infrastructure. As one skilled in the art would recognize, the GPS reference receiver and its server (or position determining entity) may be located at any surveyed location with an open view of the sky. Typical A-GPS information may include data for determining a GPS receiver's approximate position, time synchronization mark, satellite ephemerides, various model information and satellite dopplers. Different A-GPS services may omit some of these parameters; however, another component of the supplied information is the identification of the satellites for which a device or GPS receiver should search. From such assistance data, a mobile device will attempt to search for and acquire satellite signals for the satellites included in the assistance data. If, however, satellites are included in the assistance data that are not measurable by the mobile device (e.g., the satellite is no longer visible, etc.), then the mobile device will waste time and considerable power attempting to acquire measurements for the satellite.

BRIEF SUMMARY

Therefore, embodiments of the present subject matter may be employed to provide simpler hardware in mobile devices as the circuitry and respective components thereof are needed only for RF capture, downconverting, time stamping and transmission thereof to a respective location determining system. As a result of the simpler architecture, device hardware need not be restricted to GPS or other satellite system frequencies; rather, a server at a respective location determining system may specify the frequency range for RF capture, the amount of time to capture, the sampling rate and the sampling resolution.

Accordingly, there is a need for a method and apparatus for geographic location determination of a device that would overcome the deficiencies of the prior art. Therefore, an embodiment of the present subject matter provides a method for determining the location of a mobile device. The method comprises the steps of receiving at a mobile device a first set of signals from a plurality of radio frequency ("RF") sources, downconverting at the mobile device the first set of signals into a second set of signals, and time stamping at the mobile device the second set of signals. The time stamped signals may be transmitted from the mobile device to a location determining system, and the location of the mobile device determined at the location determining system as a function of the time stamped signals.

In a further embodiment of the present subject matter, a system is provided for determining the location of a mobile device from signals received from a plurality of RF sources. The system may comprise a mobile device having a receiver for receiving signals from the plural RF sources, circuitry for downconverting the received signals, circuitry for time stamping the downconverted signals, and a transmitter for transmitting the time stamped signals. The system may further include a location determining system having a receiver for receiving signals transmitted from the mobile device, and circuitry for determining the location of the mobile device as a function of the received signals from the device.

In an additional embodiment of the present subject matter, a method is provided for determining the location of a mobile device. The method may comprise the steps of transmitting at least one of a location request, a first frequency range, a first sampling duration, a first sampling rate, a first sampling resolution, and a time synchronization from a location determining system to a mobile device, and receiving at the mobile device a plurality of signals from a plurality of RF sources. The plural signals may be time stamped at the mobile device and transmitted therefrom to the location determining system. The location of the mobile device may then be determined at the location determining system as a function of the time stamped signals.

In another embodiment of the present subject matter, a method is provided for determining the location of a mobile device. The method may comprise the steps of transmitting a location request from a mobile device to a location determining system and transmitting at least one of a first frequency range, a first sampling duration, a first sampling rate, a first sampling resolution, and a time synchronization from the location determining system to the mobile device in response to the location request. A plurality of signals from a plurality of RF sources may be received and time stamped at a mobile device. The time stamped signals may be transmitted from the mobile device to the location determining system, and then the location of the mobile device determined at the location determining system as a function of the time stamped signals.

These embodiments and many other objects and advantages thereof will be readily apparent to one skilled in the art to which the invention pertains from a perusal of the claims, the appended drawings, and the following detailed description of the embodiments.

DETAILED DESCRIPTION

Figure 1:
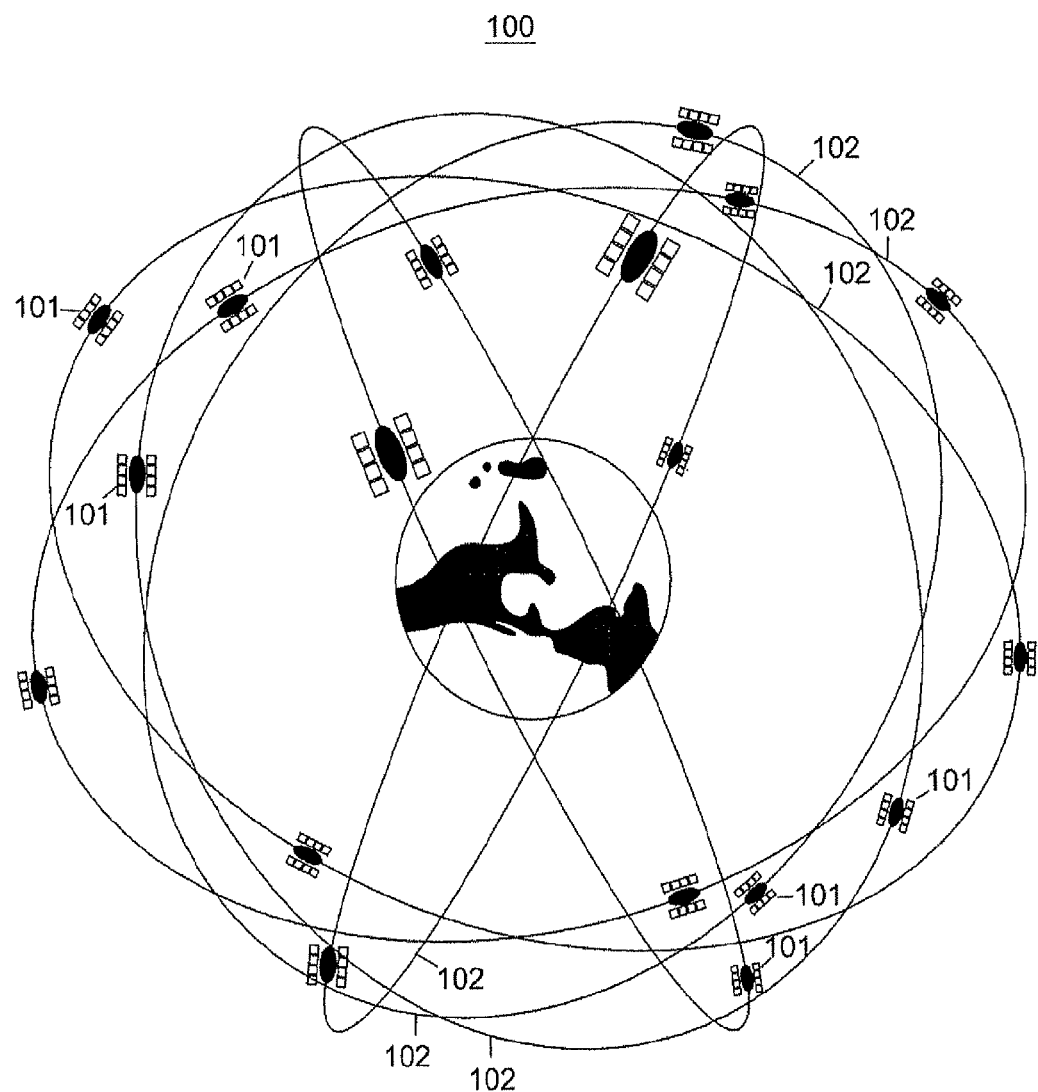
FIG. 1 is a schematic representation of a constellation of GPS satellites.

With reference to the figures where like elements have been given like numerical designations to facilitate an understanding of the present subject matter, the various embodiments of a system and method for location determination of a mobile device are herein described.

The disclosure relates to methods and apparatuses for determining geolocation of a mobile appliance using satellite signals. The satellites may be considered as part of a Global Navigation Satellite System ("GNSS"), such as, but not limited to, the U.S. Global Positioning System ("GPS"). While the following description references the GPS system, this in no way should be interpreted as limiting the scope of the claims appended herewith. As is known to those of skill in the art, other GNSS systems operate, for the purposes of this disclosure, similarly to the GPS system, such as, but not limited to, the European Satellite project, Galileo; the Russian satellite navigation system, GLONASS; the Japanese Quasi-Zenith Satellite System ("QZSS"), and the Chinese satellite navigation and positioning system called Beidou (or Compass). Therefore, references in the disclosure to GPS and/or GNSS, where applicable, as known to those of skill in the art, apply to the above-listed GNSS systems as well as other GNSS systems not listed above. Further, embodiments of the present subject matter may also receive radio frequency ("RF") signals from a cellular network, a Satellite Based Augmentation Systems ("SBAS"), a Wide Area Augmentation System ("WAAS"), the European Geostationary Navigation Overlay Service ("EGNOS"), a digital television network, and other terrestrial or airborne RF sources.

Generally wireless A-GPS devices or handsets have a low time to first fix ("TTFF") as the devices are supplied with assistance data from an exemplary communications network to assist in locking onto or acquiring satellites quickly. Exemplary network elements that supply the assistance data may be a location determining system such as a Mobile Location Center ("MLC"), location information server or system ("LIS"), or other comparable network element. The location determining system may generally be a node in a wireless network that performs the location of a mobile device.

In one embodiment of the present subject matter, a mobile device may receive signals from any RF source, downconvert these RF signals to an intermediate frequency ("IF") signal, time stamp the downconverted signal and provide the time stamped signal to a location determining system. The location determining system may then process the received data and calculate a location for the mobile device. This process may result in a simplification of hardware in the mobile device, may reduce battery consumption, and may allow a mobile device to capture any number of RF signals from various RF sources. Therefore, mobile devices may become an extensible device utilized by a network to capture signals from several RF sources as new signals become available for positioning or other purposes. In such embodiments, a server at an MLC or LIS may be updated to utilize these new signals.

Figure 2:
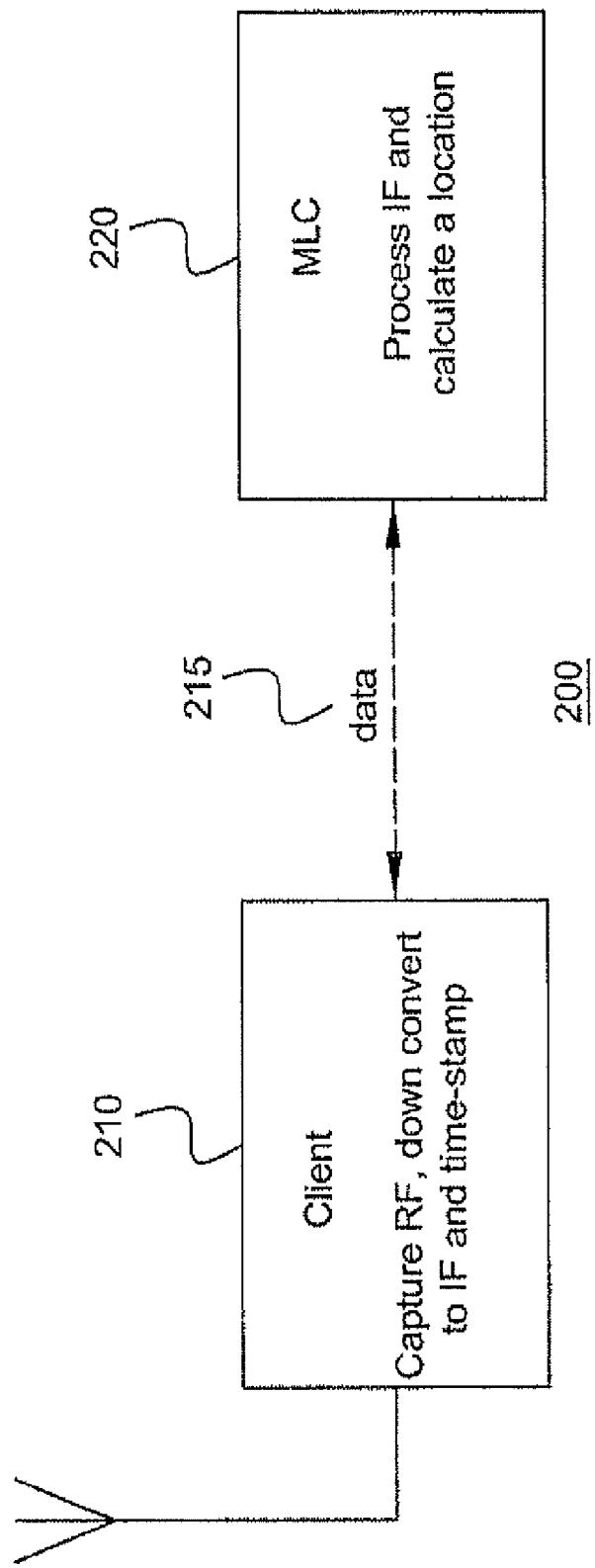
FIG. 2 is an illustration of one embodiment of the present subject matter.

FIG. 2 is an illustration of one embodiment of the present subject matter. With reference to FIG. 2, a mobile device or client 210 may be in a wire-line or a wireless network 200 and may initiate a location calculation. Of course, the location calculation may be initiated by a location determining system such as an MLC 220. The MLC 220 may also specify a predetermined frequency range of RF data to collect, a predetermined sampling duration to receive a set of RF signals, a predetermined sampling rate for each sample, a predetermined sampling resolution (e.g., number of bits per sample), a time synchronization, and combinations thereof. For example, the MLC 220 may specify that the client 210 collect RF data in the L1 frequency range for GPS signals for 50 milliseconds at a sampling rate of 5.714 MHz, a sampling resolution of 2 bits per sample, and the MLC 220 may also provide current GPS time to the client 210. The client 210 may then receive and/or record RF signals in the specified GPS frequency range at the specified sampling rate and resolution for the 50 milliseconds and time stamp the respective data 215. In one embodiment, the client 210 may target a specific frequency range utilizing conventional filtering techniques. The time stamped data 215 may then be provided through the network 200 to the MLC 220. In one embodiment, the MLC 220 may perform GPS satellite acquisition and position calculation functions to determine an estimated location of the client 210.

Figure 3:
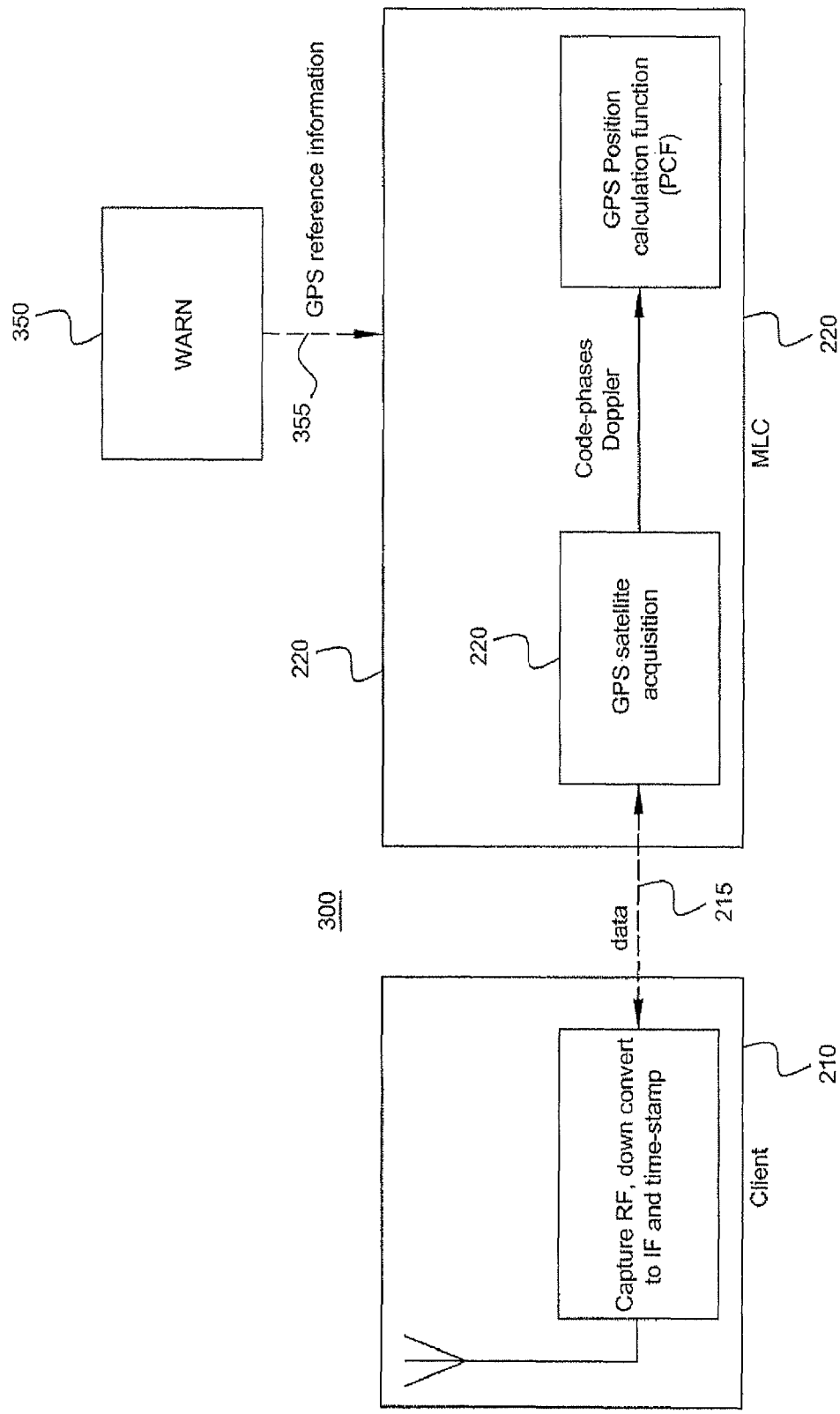
FIG. 3 is an illustration of another embodiment of the present subject matter.

FIG. 3 is an illustration of another embodiment of the present subject matter. With reference to FIG. 3, an MLC 220 may be provided with or utilize GPS reference information 355 from a wide area reference network ("WARN") 350 or other comparable reference network to determine an estimated location of the client 210. Exemplary GPS reference information may be, but is not limited to, ephemeris information, ionosphere model information, UTC model information, and other information commonly provided by a reference network.

In another embodiment of the present subject matter, the MLC 220 may request the client 210 to measure RF signals in a frequency range compatible with another GNSS or even in a frequency range compatible with a terrestrial transmitter. In this embodiment, the MLC 220, upon receiving downconverted data 215 from the client 210, may acquire appropriate signals in a manner compatible with the signals that were requested and perform a position calculation that is specific to that signal type. The MLC 220 may also request from the client RF signals more than once and may request the RF signals for different lengths of time and for different frequency ranges, sampling rates, and sampling resolutions. For example, for a location estimate of a client based upon GPS signals, an exemplary MLC 220 may request one millisecond of data to be captured in an appropriate GPS frequency range. In the event the MLC 220 cannot acquire sufficient satellites within the specified sample duration, then the client 210 may be in area having significant attenuation, etc. In this instance, the MLC 220 may request that the client 210 collect 50 milliseconds of data and/or may specify a different frequency range so that the client 210 utilizes a different GNSS or utilizes terrestrial transmitters.

Figure 4:
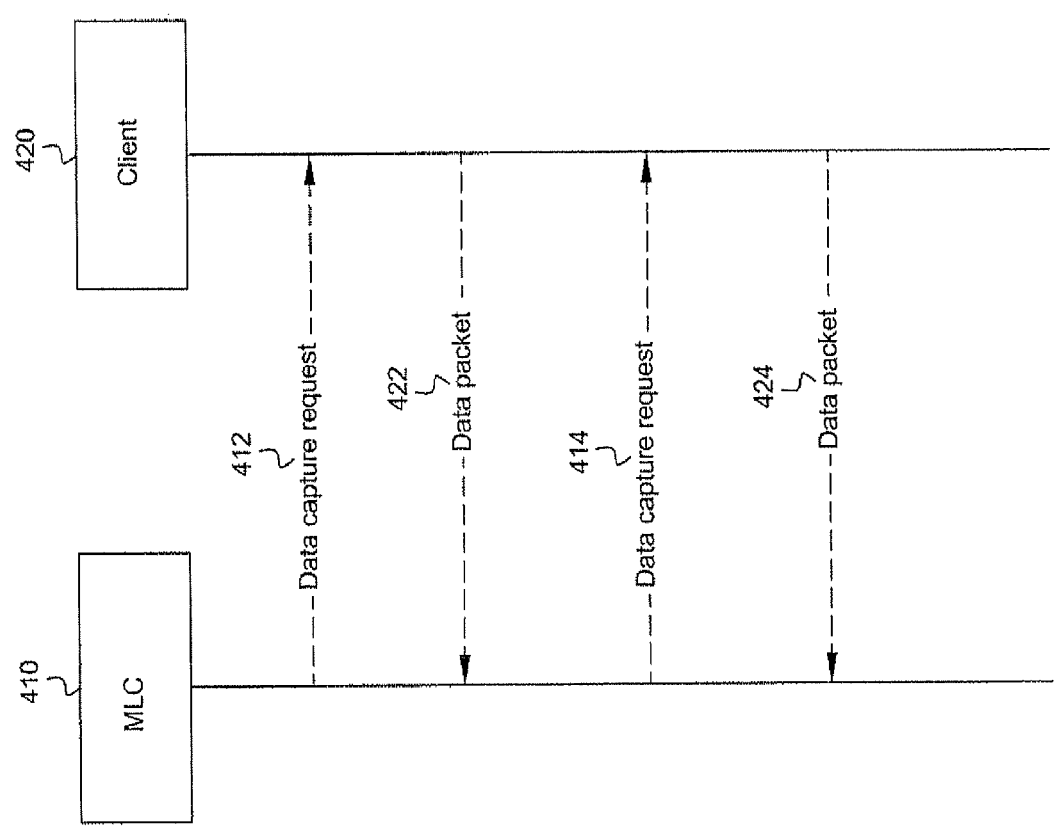
FIG. 4 is a depiction of a method according to an embodiment of the present subject matter.

FIG. 4 is a depiction of a method according to an embodiment of the present subject matter. With reference to FIG. 4, an embodiment of the present subject matter is illustrated having a server-initiated location transaction. In this embodiment, an MLC 410 may send a data capture request 412 to a client 420, the request including a frequency range to capture, a sampling duration, a sampling rate, a sampling resolution, and a synchronization value. In one embodiment, an exemplary request 412 may request that a client 420 capture RF signals as IF and/or may include the amount of time in milliseconds to capture the RF signals, the frequency range to capture, the sampling rate at which to capture, the sampling resolution, and time synchronization. The client 420 may receive RF signals as a function of the frequency range, duration, sampling rate and sampling resolution and send a data packet 422 back to the MLC 410. In one embodiment, an exemplary packet 422 may include the time at which the RF capture was commenced and the time at which the received RF signals were digitized as IF. In another embodiment, the MLC 410 may send additional data capture requests 414 to the client 420 if, by way of a non-limiting example, the original sample duration was insufficient to receive enough measurements or if the MLC 410 requires measurements from other RF sources. The client 420 may receive any RF signals as a function of information in the additional data capture requests 414 and send additional data packets 424 back to the MLC 410. While not illustrated, the MLC 410 may send a position response to the client 420 including the estimated location of the client 420. The position response may also be provided in response to a position request from the client 420.

Figure 5:
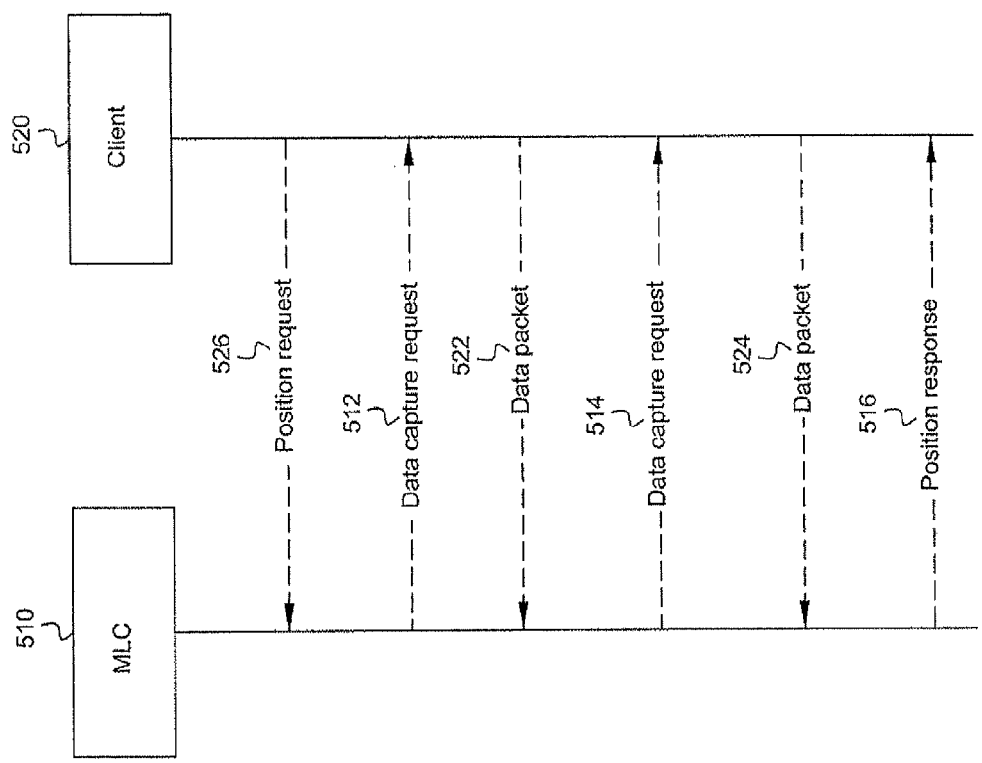
FIG. 5 is a depiction of another method according to an embodiment of the present subject matter.

FIG. 5 is a depiction of another method according to an embodiment of the present subject matter. With reference to FIG. 5, an embodiment of the present subject matter is illustrated having a client-initiated location transaction. In this embodiment, an MLC 510 may receive a position request 526 from a client 520. In response to the position request 522, the MLC 510 may send a data capture request 512 to the client, and the request may include, without limitation, a frequency range to capture, a sampling duration, a sampling rate, a sampling resolution, and a time synchronization value. The client 520 may receive RF signals as a function of the information in the data capture request 512 and send a data packet 522 back to the MLC 510. In another embodiment, the MLC 510 may send additional data capture requests 514 to the client 520 if, by way of a non-limiting example, the original sample duration was insufficient to receive enough measurements or if the MLC 510 requires measurements from other RF sources. The client 520 may receive RF signals as a function of information in the additional data capture requests 514 and send additional data packets 524 back to the MLC 510. The MLC 510 may then send a position response 516 to the client 520 that includes an estimated location of the client 520.

Figure 6:
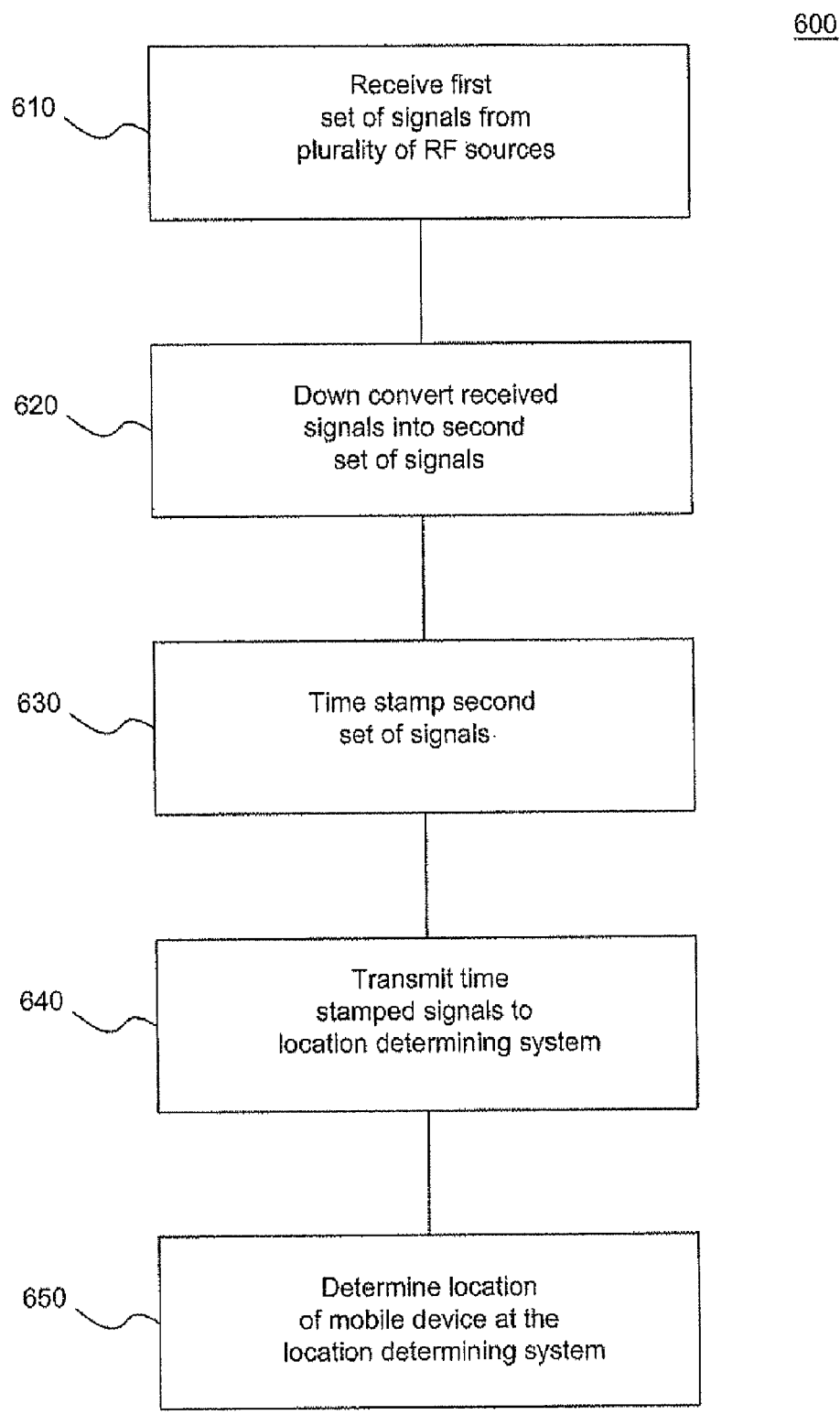
FIG. 6 is an algorithm according to one embodiment of the present subject matter.

FIG. 6 is an algorithm according to one embodiment of the present subject matter. With reference to FIG. 6, a method for determining the location of a mobile device 600 is provided. The device may be a cellular device, text messaging device, computer, portable computer, vehicle locating device, vehicle security device, communication device, or wireless transceiver. At step 610, a mobile device may receive a first set of signals from a plurality of RF sources and at step 620, these received signals may be downconverted at the mobile device into a second set of signals. RF sources may be a cellular network, a GNSS, a GPS, the Galileo system, GLONASS system, Quasi-Zenith Satellite System ("QZSS"), Compass system, Bediou system, Satellite Based Augmentation Systems ("SBAS"), Wide Area Augmentation Systems ("WAAS"), the European Geostationary Navigation Overlay Service ("EGNOS"), a digital television network, and combinations thereof.

The mobile device may then time stamp the second set of signals at step 630 and then, at step 640, transmit the time stamped signals to a location determining system. An exemplary location determining system may be, but is not limited to, an MLC or an LIS. At the location determining system, the location of the mobile device may be determined as a function of the time stamped signals at step 650. In another embodiment, the method may include transmitting from the location determining system to the mobile device at least one of a location request, a predetermined frequency range, a predetermined sampling duration, a predetermined sampling rate, and a predetermined sampling resolution to receive the first set of signals. In one embodiment of the present subject matter, the location of the device is determined also as a function of information from a reference network such as a WARN. Exemplary information may be, but is not limited to, ephemeris information, ionosphere model information, UTC model information, and combinations thereof.

Figure 7:
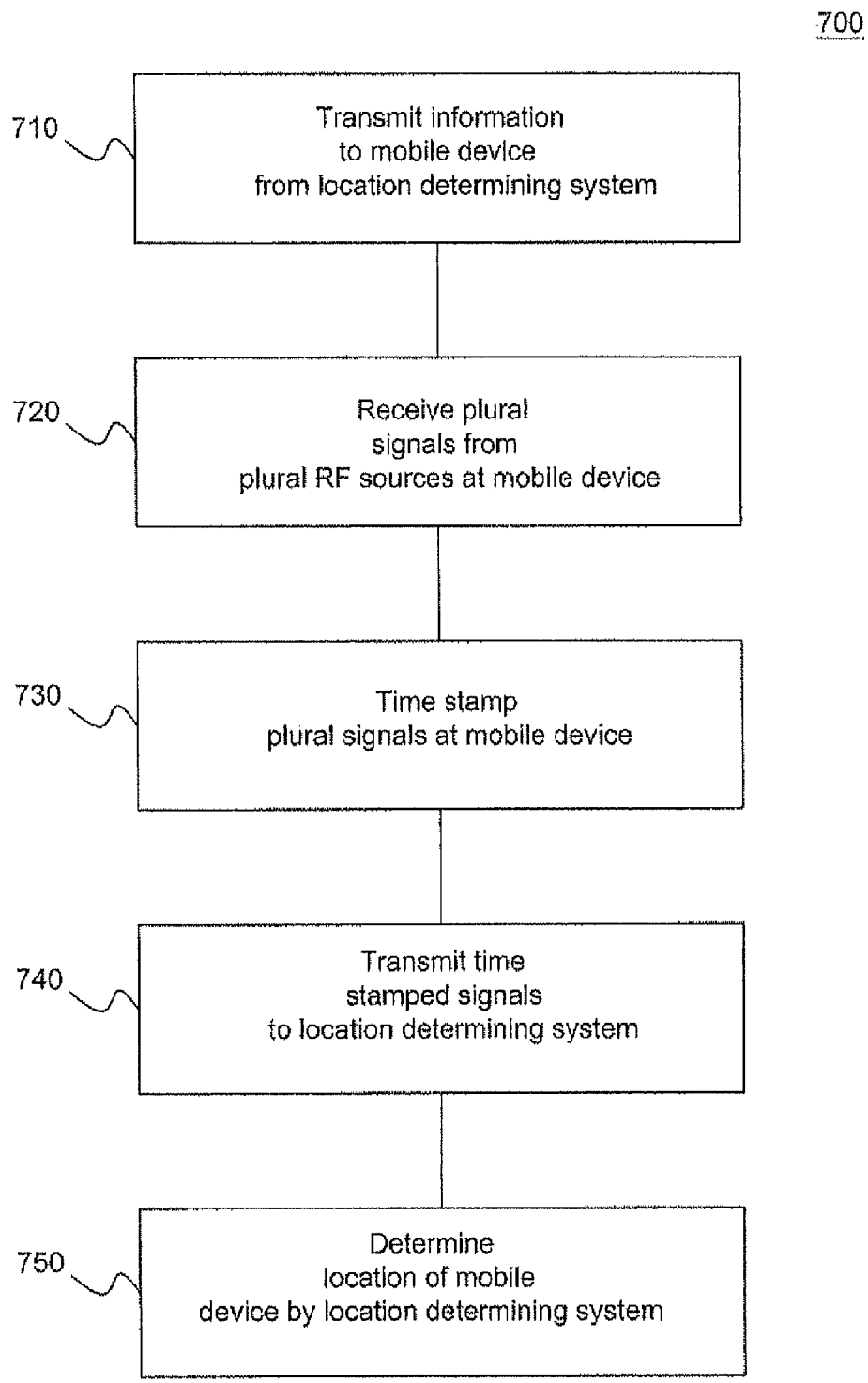
FIG. 7 is an algorithm according to another embodiment of the present subject matter.

FIG. 7 is an algorithm according to another embodiment of the present subject matter. With reference to FIG. 7, a method for determining the location of a mobile device 700 is provided. At step 710, at least one of a location request, a first frequency range, a first sampling duration, a first sampling rate, a first sampling resolution, and a time synchronization may be transmitted from a location determining system to a mobile device. The mobile device may then receive a plurality of signals from a plurality of RF sources at step 720 and time stamp the plural signals at step 730. The mobile device, at step 740, may then transmit the time stamped signals to the location determining system. The location of the mobile device may be determined at the location determining system as a function of the time stamped signals at step 750. In one embodiment, the method may further comprise the step of downconverting at the mobile device the received plural signals into a plurality of intermediate frequency signals. A further embodiment may include the step of transmitting at least one of a second frequency range, second sampling duration, second sampling rate, and/or second sampling resolution from the location determining system to the mobile device if the sampling duration provided an insufficient number of plural signals or if plural signals from another RF source is required. In yet a further embodiment, steps 710 through 740 may be iteratively repeated a predetermined number of times. Of course, the location of the device may be determined as a function of information from a reference network such as a WARN.

Figure 8:
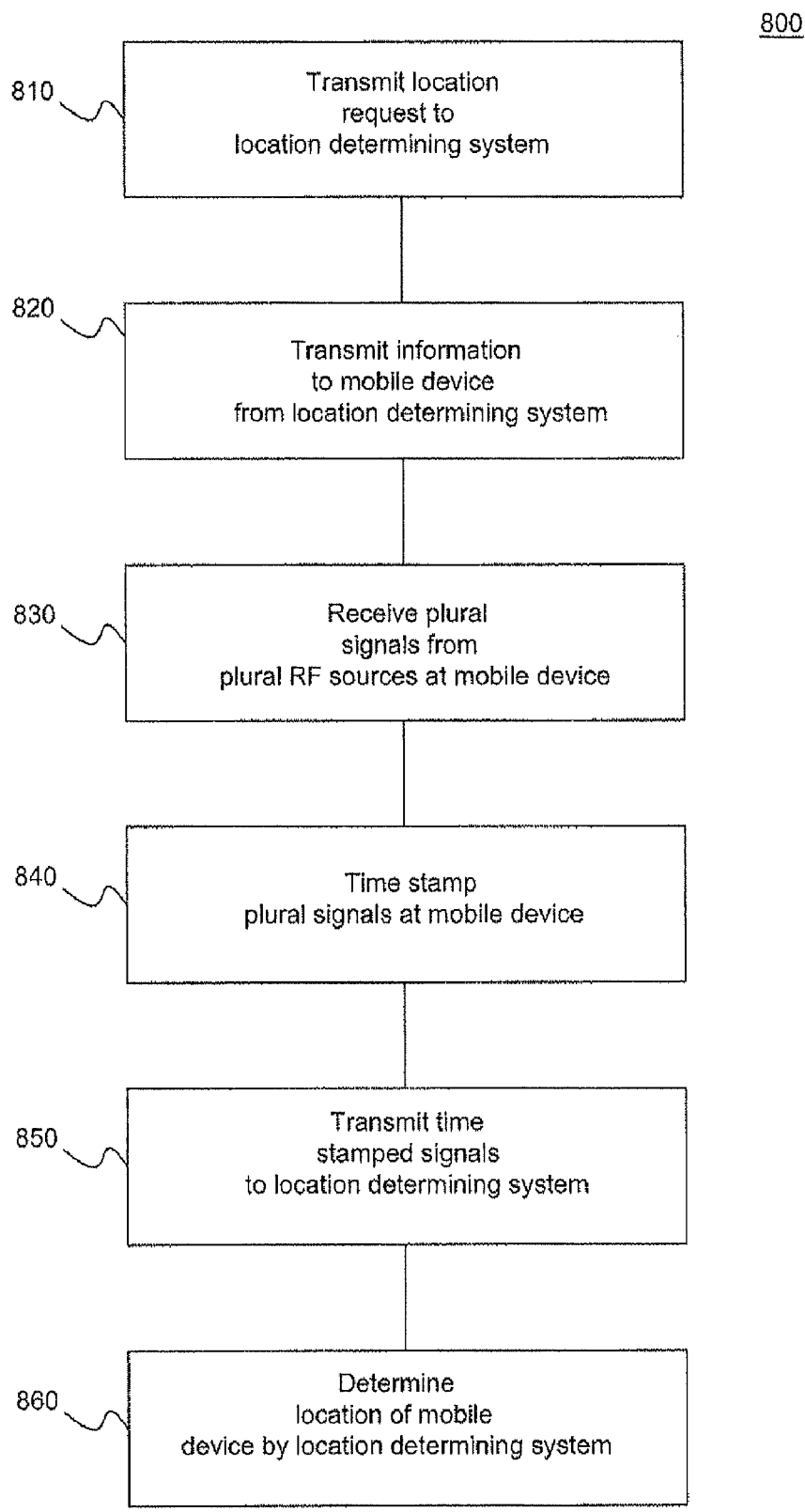
FIG. 8 is an algorithm according to an embodiment of the present subject matter.

FIG. 8 is an algorithm according to an embodiment of the present subject matter. With reference to FIG. 8, a method for determining the location of a mobile device 800 is provided. At step 810, a location request may be transmitted from a mobile device to a location determining system. In response to the location request, the location determining system may transmit to the device, at step 820, one or any combination of a first frequency range, a first sampling duration, a first sampling rate, a first sampling resolution and a time synchronization. The mobile device may then receive a plurality of signals from a plurality of RF sources at step 830 and time stamp the plural signals at step 840. The time stamped signals may be transmitted from the mobile device to the location determining system at step 850, and the location of the mobile device determined by the location determining system as a function of the time stamped signals at step 860. In one embodiment, the method may further comprise the step of downconverting at the mobile device the received plural signals into a plurality of intermediate frequency signals. A further embodiment may include the step of transmitting at least one of a second frequency range, second sampling duration, second sampling rate, and/or second sampling resolution from the location determining system to the mobile device if the sampling duration provided an insufficient number of plural signals or if plural signals from another RF source is required. Of course, the location of the device may be determined as a function of information from a reference network such as a WARN.

Figure 9:
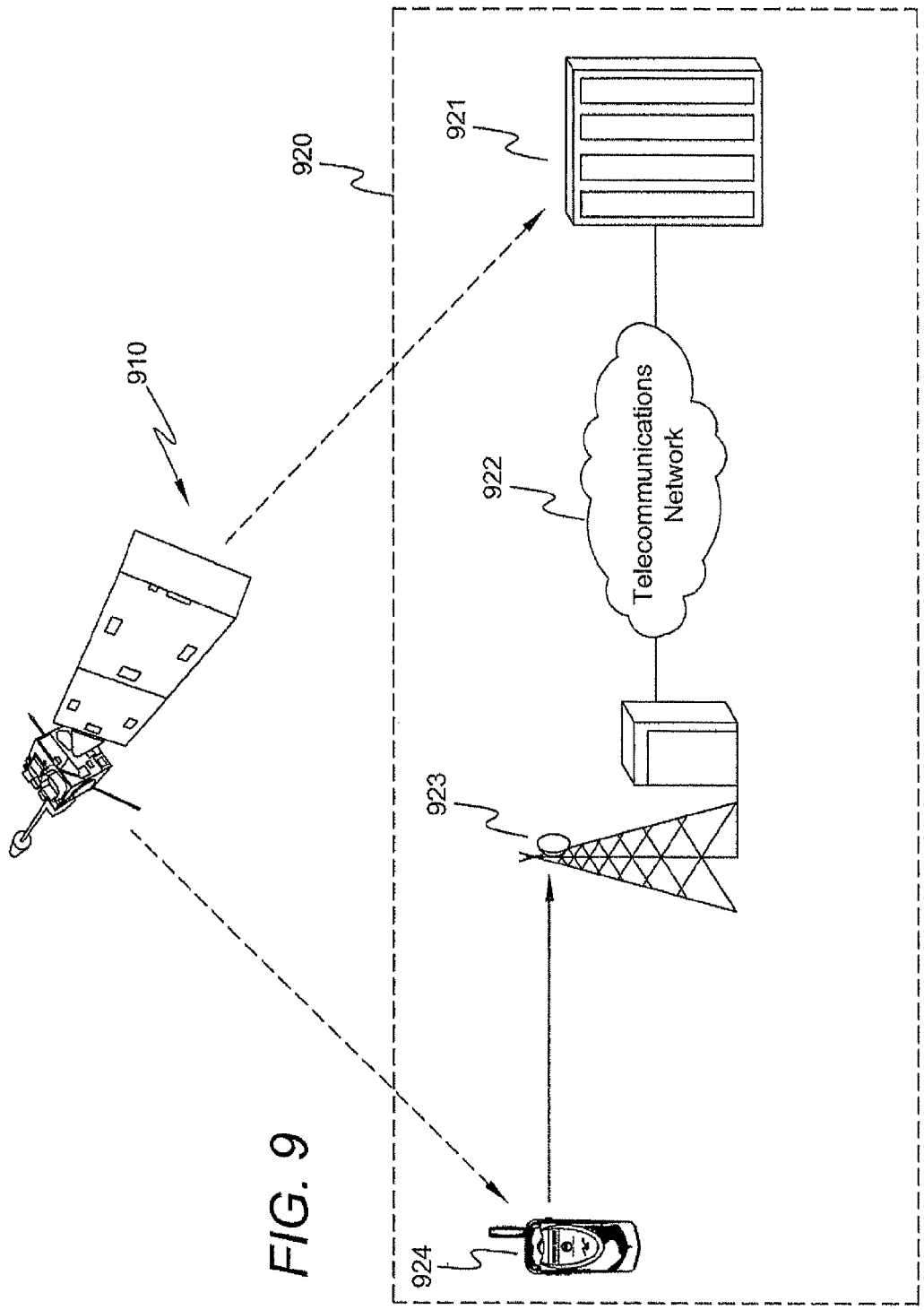
FIG. 9 is a schematic representation for implementing one embodiment of the present subject matter.

FIG. 9 is a schematic representation for implementing one embodiment of the present subject matter. With reference to FIG. 9, a satellite system 910 may communicate with a terrestrial system 920. An exemplary satellite system 910 may be a GNSS such as, but not limited to, a GPS, Galileo system, GLONASS system, QZSS, Compass system, Bediou system, etc. The ground system 920 may include a cellular network having a location center 921 and may receive information from or include a SBAS, WAAS, EGNOS, digital television network, and combinations thereof. The location center 921 may be an MLC, LIS or other network component such as a central office configured to communicate with a telecommunications network 922 and/or at least one base station 923. The location center 921 may include a receiver for receiving signals transmitted from a mobile device 924, and circuitry for determining the location of the mobile device 924 as a function of received signals from the device 924. The location center 921 may also include a database having information from a reference network such as a WARN. In a further embodiment, the location center 921 may include a transmitter for transmitting to the mobile device 924 at least one of a location request, a predetermined frequency range, a predetermined sampling duration, a predetermined sampling rate, a predetermined sampling resolution to receive signals from plural RF sources, and a time synchronization. An exemplary device 924 may include a receiver for receiving signals from the plural RF sources, circuitry for downconverting the received signals, circuitry for time stamping the downconverted signals, and a transmitter for transmitting the time stamped signals. Exemplary devices 924 may be, but are not limited to, a cellular device, text messaging device, computer, portable computer, vehicle locating device, vehicle security device, communication device, or wireless transceiver.

The location center 921 may or may not receive a preliminary estimate of the device's location or boundary thereof on the basis of the device's serving or neighboring cell site, sector, network boundary, or other area. The location center 921 may also determine a plurality of satellites as a function of this boundary or region and determine whether any one or more of these plural satellites, while operational, are not visible by the device 924 for some reason. The location center 921 may also receive satellite information from GPS satellites. The satellite information may include the satellite's broadcast ephemeris information of the broadcasting satellite, that of all satellites, or that of selected satellites. Further, the location center 921 may manipulate any assistance data to prevent the device 924 from searching and attempting to acquire RF signals from one or more satellites or RF signals from other RF sources. This information may then be transmitted or relayed to the device 924 and utilized for location determination by the center 921. The location center 921 may relay the information back to the device 924 or use the information, either singularly or along with some preliminary estimation of the device's location, to assist in determining a geographic location of the device 924.

It is thus an aspect of embodiments of the present subject matter to employ simpler hardware in mobile devices as the circuitry and respective components thereof are needed only for RF capture, downconverting, time stamping and transmission thereof to a respective location determining system. As a result of the simpler architecture, device hardware need not be restricted to GPS or other satellite system frequencies; rather, a server at a respective location determining system may specify the frequency range for RF capture, the amount of time to capture, the sampling rate and the sampling resolution. It is also an aspect of embodiments of the present subject matter that assistance data is no longer required to be provided to a mobile device.

It is an additional aspect for GPS based location methods according to an embodiment of the present subject matter that there is no longer a requirement for a cell table as the cell table is generally required for assistance data calculation. Another aspect of embodiments of the present subject matter eliminate the need to update hardware and/or software in mobile devices as additional RF sources become available; in this instance, a location server may be updated instead.

It is another aspect of embodiments of the present subject matter to eliminate the need for assistance data and transfer complex processing back to a location server thereby resulting in simpler client or device hardware and more efficient use of power. Additionally, as assistance data is no longer required, the location determining system does not need to know the approximate location of the client (e.g., no cell database is required); therefore, an exemplary position calculation may becomes a two-step approach where the approximate location is calculated using Doppler measurements and provided as a seed to a code-phase based calculation. Additionally, as data may be transmitted through the air from the mobile device to a location determining system, appropriate data compression may be provided on the respective link or channel. An exemplary algorithm may also be utilized to compress and/or decode the transmitted data.

As shown by the various configurations and embodiments illustrated in FIGS. 1-9, a method and system for location determination of a mobile device have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for determining the location of a mobile device comprising the steps of:
    (a) transmitting at least one of a location request, a first frequency range, a first sampling duration, a first sampling rate, a first sampling resolution, and a time synchronization from a location determining system to a mobile device;
    (b) receiving at the mobile device a plurality of signals from a plurality of radio frequency ("RF") sources;
    (c) time stamping the plural signals at the mobile device;
    (d) transmitting the time stamped signals from the mobile device to the location determining system;

(e) determining the location of the mobile device at the location determining system as a function of the time stamped signals; and (f) transmitting at least one of a second frequency range, second sampling duration, second sampling rate, and second sampling resolution from the location determining system to the mobile device if the sampling duration provided an insufficient number of plural signals or if plural signals from another RF source is required, wherein the location determining system is a mobile location center ("MLC") or a location information server ("LIS").

2. The method of claim 1 further comprising the step of downconverting at the mobile device the received plural signals into a plurality of intermediate frequency signals.

3. The method of claim 1 further comprising iteratively repeating steps (a)-(d).

4. The method of claim 1 wherein the location of the device is determined also as a function of information from a wide area reference network ("WARN").

5. The method of claim 4 wherein the information is at least one of ephemeris information, ionosphere model information, UTC model information, and combinations thereof.

6. A method for determining the location of a mobile device comprising the steps of:

(a) transmitting a location request from a mobile device to a location determining system;

(b) transmitting at least one of a first frequency range, a first sampling duration, a first sampling rate, a first sampling resolution, and a time synchronization from the location determining system to the mobile device in response to the location request;

(c) receiving at a mobile device a plurality of signals from a plurality of radio frequency ("RF") sources;

(d) time stamping at the mobile device the plural signals;

(e) transmitting the time stamped signals from the mobile device to the location determining system;

(f) determining the location of the mobile device at the location determining system as a function of the time stamped signals; and (g) transmitting at least one of a second frequency range, second sampling duration, second sampling rate, and second sampling resolution from the location determining system to the mobile device if the sampling duration provided an insufficient number of plural signals or if plural signals from another RF source is required, wherein the location determining system is a mobile location center ("MLC") or a location information server ("LIS").

7. The method of claim 6 further comprising the step of downconverting at the mobile device the received plural signals into a plurality of intermediate frequency signals.

8. The method of claim 6 wherein the location of the device is determined also as a function of information from a wide area reference network ("WARN").

9. The method of claim 8 wherein the information is at least one of ephemeris information, ionosphere model information, UTC model information, and combinations thereof.

10. A method for determining the location of a mobile device comprising the steps of:

(a) transmitting at least one of a location request, a first frequency range, a first sampling duration, a first sampling rate, a first sampling resolution, and a time synchronization from a location determining system to a mobile device;

(b) receiving at the mobile device a plurality of signals from a plurality of radio frequency ("RF") sources;

(c) time stamping the plural signals at the mobile device;

(d) transmitting the time stamped signals from the mobile device to the location determining system; and (e) determining the location of the mobile device at the location determining system as a function of the time stamped signals, wherein the location determining system is a mobile location center ("MLC") or a location information server ("LIS"), wherein the location of the device is determined also as a function of information from a wide area reference network ("WARN"), and wherein the information is at least one of ephemeris information, ionosphere model information, UTC model information, and combinations thereof.

11. The method of claim 10 further comprising the step of downconverting at the mobile device the received plural signals into a plurality of intermediate frequency signals.

12. The method of claim 10 further comprising the step of transmitting at least one of a second frequency range, second sampling duration, second sampling rate, and second sampling resolution from the location determining system to the mobile device if the sampling duration provided an insufficient number of plural signals or if plural signals from another RF source is required.

13. The method of claim 10 further comprising iteratively repeating steps (a)-(d).

14. A method for determining the location of a mobile device comprising the steps of:

(a) transmitting a location request from a mobile device to a location determining system;

(b) transmitting at least one of a first frequency range, a first sampling duration, a first sampling rate, a first sampling resolution, and a time synchronization from the location determining system to the mobile device in response to the location request;

(c) receiving at a mobile device a plurality of signals from a plurality of radio frequency ("RF") sources;

(d) time stamping at the mobile device the plural signals;

(e) transmitting the time stamped signals from the mobile device to the location determining system; and (f) determining the location of the mobile device at the location determining system as a function of the time stamped signals, wherein the location determining system is a mobile location center ("MLC") or a location information server ("LIS"), wherein the location of the device is determined also as a function of information from a wide area reference network ("WARN"), and wherein the information is at least one of ephemeris information, ionosphere model information, UTC model information, and combinations thereof.

15. The method of claim 14 further comprising the step of downconverting at the mobile device the received plural signals into a plurality of intermediate frequency signals.

16. The method of claim 14 further comprising the step of transmitting at least one of a second frequency range, second sampling duration, second sampling rate, and second sampling resolution from the location determining system to the mobile device if the sampling duration provided an insufficient number of plural signals or if plural signals from another RF source is required.

* * * * *